United States Patent [19]

Horiike et al.

[11] Patent Number: 4,660,215

[45] Date of Patent: Apr. 21, 1987

[54] TRANSMITTER/RECEIVER SYSTEM

[75] Inventors: Yoshio Horiike, Katano; Yasuo Nagaishi, Hirakata; Kiyotake Fukui, Settsu, all of Japan

[73] Assignee: Matsushita Electric Industrial Co., Ltd., Kadoma, Japan

[21] Appl. No.: 678,032

[22] Filed: Dec. 4, 1984

[30] Foreign Application Priority Data

| Dec. 7, 1983 | [JP] | Japan | 58-230807 |
| Apr. 26, 1984 | [JP] | Japan | 59-85422 |
| May 22, 1984 | [JP] | Japan | 59-102920 |
| Jun. 22, 1984 | [JP] | Japan | 59-129816 |

[51] Int. Cl.$^4$ .................................................. H03M 7/00
[52] U.S. Cl. ........................... 375/48; 340/825.73; 340/825.75; 375/97; 324/77 E
[58] Field of Search ............... 364/480, 701, 702, 726; 375/45, 48, 51, 56, 88, 89, 97; 455/37, 358, 359; 340/825.48, 825.73, 825.75; 332/9 R, 10; 329/104, 105, 110; 324/77 B, 77 D, 77 E, 77 G, 77 H, 78 D

[56] References Cited

U.S. PATENT DOCUMENTS

| 3,866,124 | 2/1975 | Wykoff | 455/37 |
| 3,990,071 | 11/1976 | Ito et al. | 340/825.75 |
| 4,045,767 | 8/1977 | Nishihara et al. | 324/77 E |
| 4,291,269 | 9/1981 | Nossen | 324/77 G |
| 4,306,308 | 12/1981 | Nossen | 340/825.75 |

Primary Examiner—Benedict V. Safourek
Attorney, Agent, or Firm—Wenderoth, Lind & Ponack

[57] ABSTRACT

A transmitter/receiver system for converting digital information into a multi-frequency signal for transmission. A reference frequency signal is first transmitted, then a series of frequencies having information indicative of differences with the reference signal are transmitted, and a receiver discriminates differences with the reference frequency signal to decode the information.

1 Claim, 15 Drawing Figures

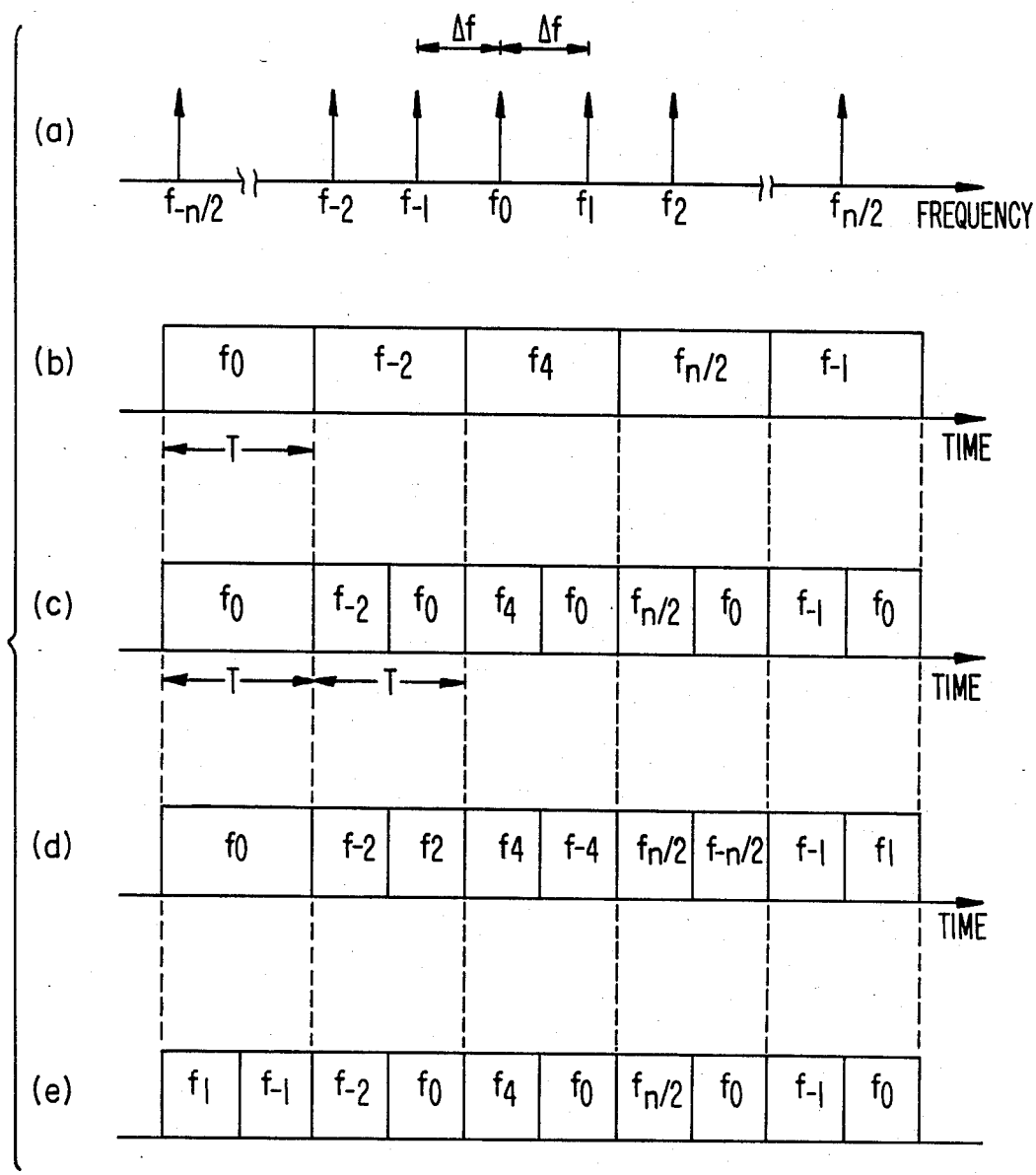
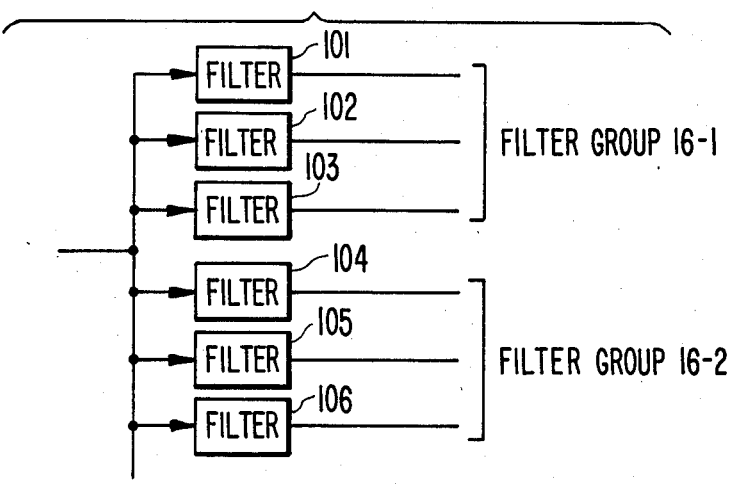

FIG. 12.
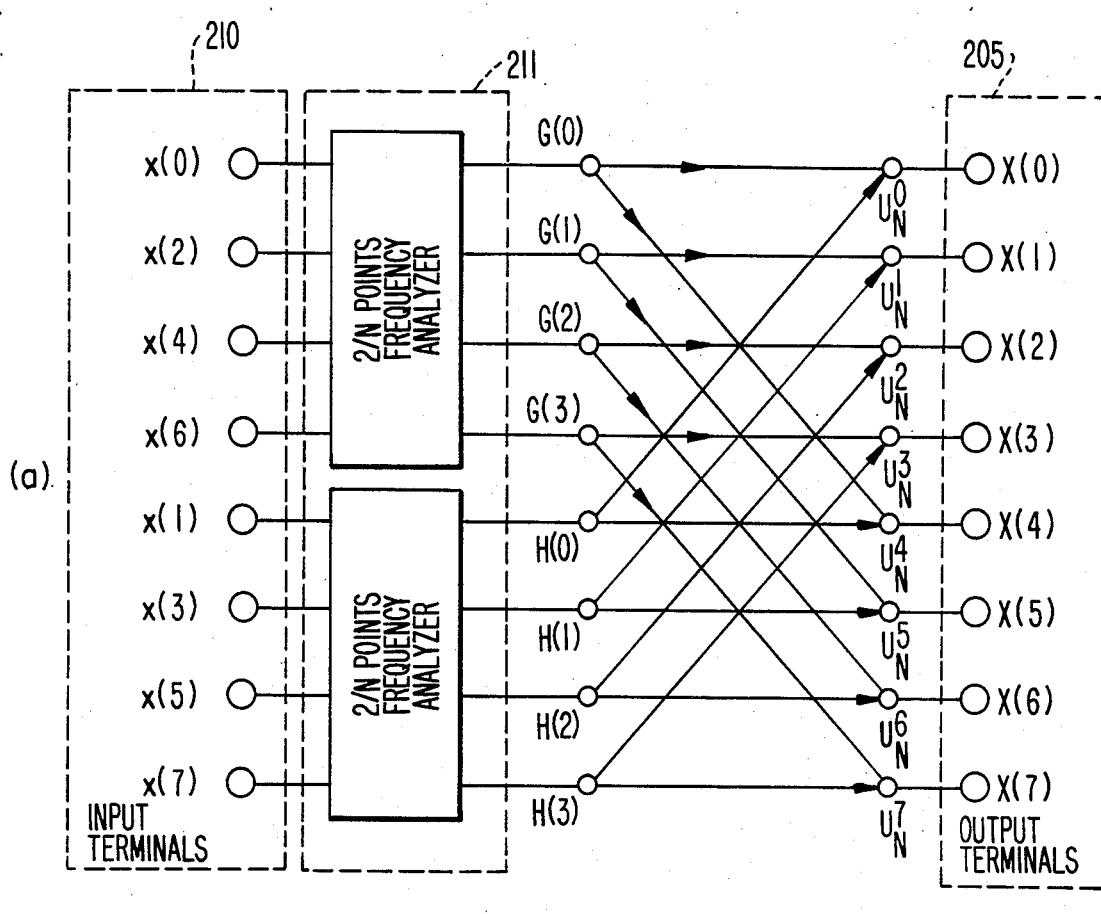
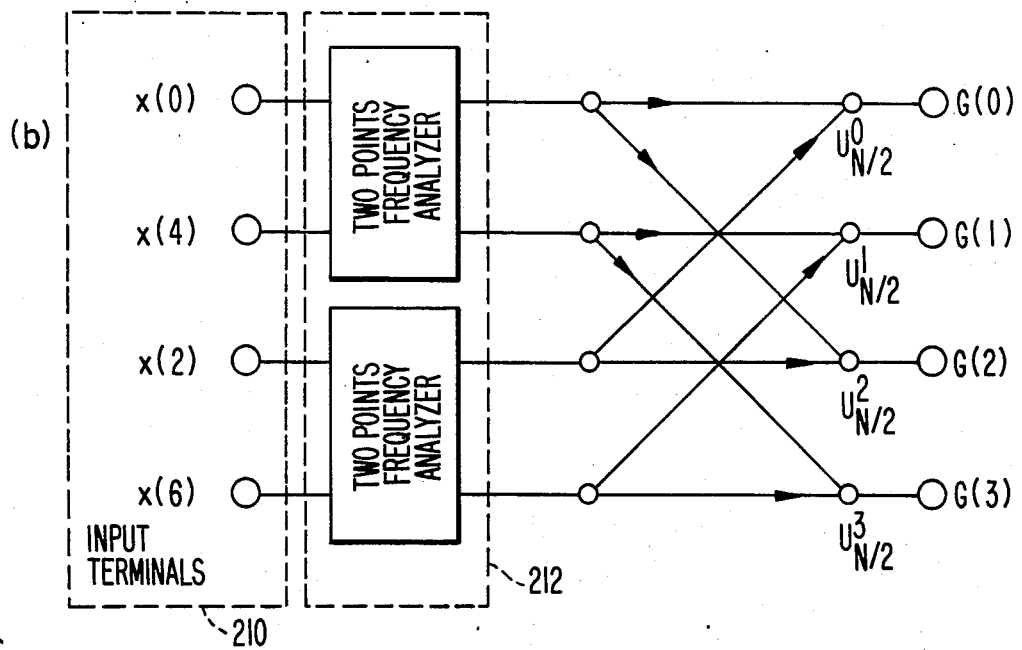

TRANSMITTER/RECEIVER SYSTEM

BACKGROUND OF THE INVENTION

1. Field of the Invention

The present invention relates to a transmitter/ receiver system for data communications.

2. Description of the Prior Art

Transmitter/receiver systems employing a multi-frequency signal have heretofor employed a method of frequency-modulating a carrier with the multi-frequency signal for transmission. This method is advantageous in that any frequency drift of the carrier due for example to temperature does not affect the frequency of the multi-frequency signal. However, the method has the following two drawbacks:

(1) Since the carrier is frequency-modulated by the multi-frequency signal, the bandwidth in a transmission line is increased as compared with that of the multi-frequency signal.

(2) A demodulator circuit for demodulating the frequency-modulated signal suffers a problem. More specifically, when the demodulator circuit receives a signal having an S/N ratio lower than a threshold level for improving the S/N ratio, the demodulator circuit produces a demodulated output having quite a bad S/N ratio. Such a phonomenon is caused in principle by any FM demodulator circuits. When a weak signal having an S/N ratio lower than the threshold level, therefore, the demodulated multi-frequency signal has an extremely bad S/N ratio and cannot properly be detected. Accordingly, a limit signal level that can be recieved depends on the threshold level for improving the S/N ratio in the FM demodulator circuit, and there is a limitation on the distance for which signals can be transmitted and received.

SUMMARY OF THE INVENTION

It is an object of the present invention to provide a transmitter/receiver system in data communications, which is capable of reducing the occupied bandwidth of a transmitted signal and of highly increasing the distance for which signals can be transmitted and received.

The above object can be achieved by a transmitter/ receiver system comprising a transmitter having a multi-frequency signal generator for issuing a signal of a reference frequency and then a signal composed of a frequency sequence having information indicative of frequency differences with the reference frequency, and a receiver having a frequency analyzer for analyzing the frequencies of the signal from the transmitter and an information decoder supplied with a signal from the frequency analyzer for decoding the information based on the frequency difference between the signal of the frequency sequence and the signal of the reference frequency.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 2 is a diagram explanatory of the function of a multi-frequency signal generator circuit in the transmitter/receiver system;

FIG. 3 is a block diagram of a frequency analyzer circuit in the transmitter/receiver system;

FIG. 12 is a flow-graph illustrative of a frequency analysis in the frequency analyzer circuit shown in FIG. 11;

DESCRIPTION OF THE PREFERRED EMBODIMENTS

Figure 1:
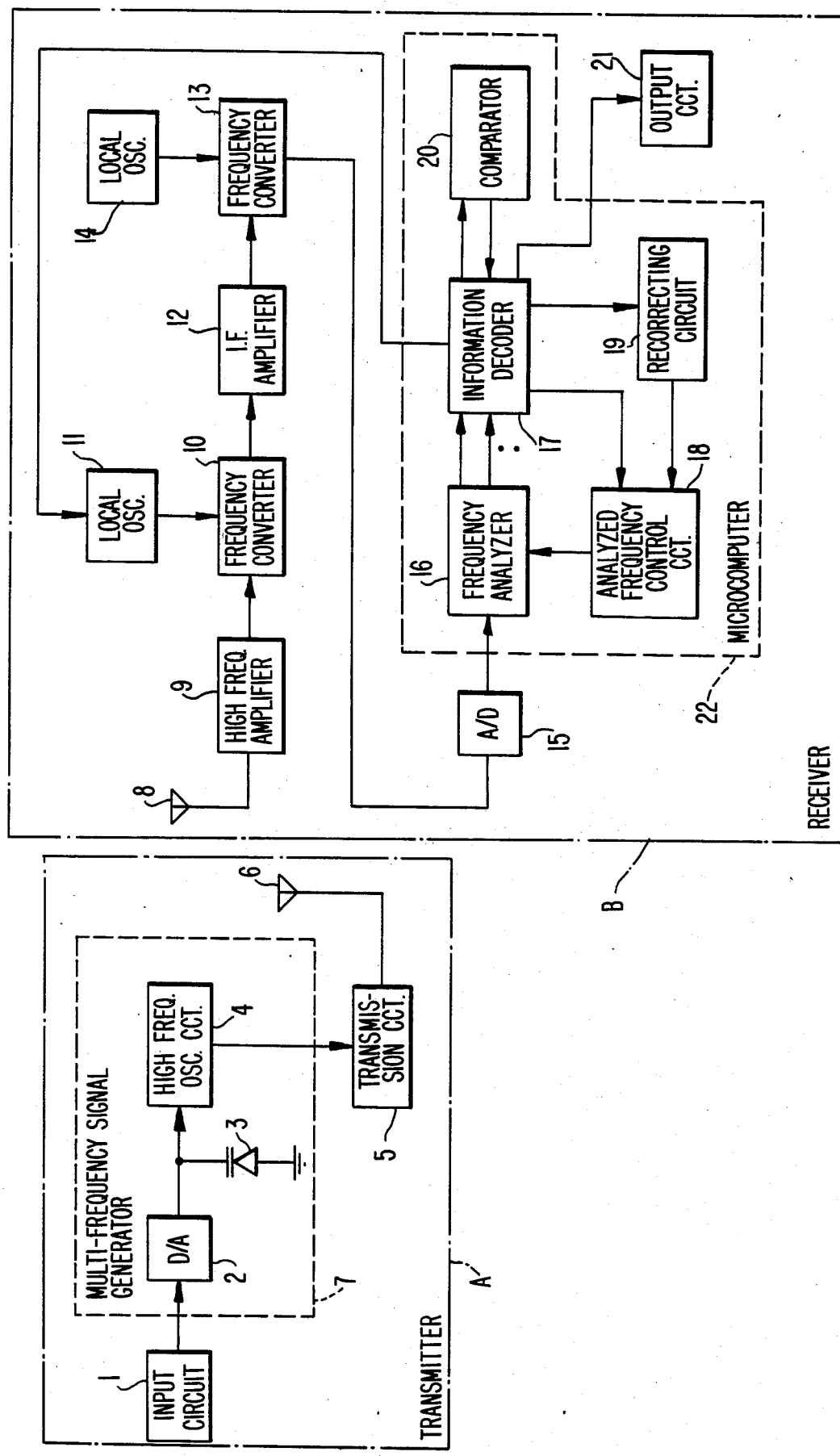
FIG. 1 is a block diagram of a transmitter/receiver system according to the present invention.

FIG. 1 shows in block form a transmitter/receiver system according to an embodiment of the present invention. The transmitter/receiver system is generally composed of a transmitter A and a receiver B.

The transmitter A has an input circuit 1 and a multi-frequency signal generator 7. The multi-frquency signal generator 7 comprises a D/A converter 2, a high-frequency oscillator circuit 4, and a variable-capacity diode 3. The transmitter 6 also has a transmission circuit 5 and a transmission antenna 6. The receiver B has a reception antenna 8, a high-frequency amplifier 9, a local oscillator 11, a frequency converter 10, an intermediate-frequency amplifier 12, a local oscillator 14, a frequency converter 13, an A/D converter 15, a frequency analyzer 16, an information decoder 17, an analyzed frequency control cicuit 18, comparator 20, and a recorrecting circuit 19. The frequency analyzer 16, the information decoder 17, the analyzed frequency control circuit 18, the comparator 20, and the recorrecting circuit 19 are constructed in the form of a microcomputer 22. The receiver B also includes an output circuit 21.

Operation of the transmitter/receiver system is as follows: Digital information from the input circuit 1 is applied to the A/D converter 2 in the multi-frequency signal generator 7, and converted thereby into an analog quantity, which controls the capacitance of the variable-capacity diode 3 to control a high frequency produced by the high-frequency oscillator 4. In response to actuation of a ten-key-pad switch, a digital signal having a reference frequency $f_0$ is issued from the input circuit 1 and then a digital signal representative of input information is issued therefrom. The digital signal of the input information is converted by the D/A converter 2 into analog quantity, which varies the high frequency of the high-frequency oscillator 4 dependent on the information. Since the analog quantity issued from the D/A converter 2 varies in a step-like patttern dependent on the information, the spectrum and output of the high frequency issued from the high-frequency oscillator 4 are as shown in FIG. 2 at (a) and (b). FIG. 2(a) is a spectrum diagram of freuqencies that can be generated by the multi-frequency generator 7. FIGS. 2(b) through 2(e) are illustrative of frequencies issued from the multi-frequency generator 7.

The multi-frequency generator 7 is basically differennt in function from conventional multi-frequency generators in that it has a reference frequency $f_0$ and information is defined in relation to the reference frequency $f_0$. The following table shows an example in which pieces of information are defined as differences with the reference frequency.

TABLE

| Frequency difference (from reference $f_0$) | Tone frequency | Information |
| --- | --- | --- |
| $-5 \Delta f$ | $f_{-5}$ | numeral 0 |
| $-4 \Delta f$ | $f_{-4}$ | numeral 1 |
| $-3 \Delta f$ | $f_{-3}$ | numeral 2 |
| $-2 \Delta f$ | $f_{-2}$ | numeral 3 |
| $-\Delta f$ | $f_{-1}$ | numeral 4 |
| $\Delta f$ | $f_1$ | numeral 5 |
| $2 \Delta f$ | $f_2$ | numeral 6 |
| $3 \Delta f$ | $f_3$ | numeral 7 |
| $4 \Delta f$ | $f_4$ | numeral 8 |
| $5 \Delta f$ | $f_5$ | numeral 9 |

In the above example, all of the differences between adjacent frequencies in FIG. 2(a) are $\Delta f$, n =10 (this value will be used hereinafter), and the numerals 0 to 10 are employed as information. FIG. 2(b) illustrates one example of the output from the multi-frequency generator 7. First, the reference frequency $f_0$ is generated, and then a series of frequencies containing the information are generated. In the exmaple of FIG. 2(b), the pieces of information are issued in a succession of numeral 3, numeral 8, numeral 9, and numeral 4 in the order named. The signal of FIG. 2(b) is amplified by the transmitter 5, and transmitted as an electromagnetic wave by the transmission antenna 6.

The receiver B will now be described. The reception antenna 8 through the intermediate-frequency amplifier 12 operate in the same manner as that of the corresponding parts in a conventional superheterodyne receiver. An output signal from the intermediate-frequency amplifier 12 is converted by the frequency converter 13 into a signal of a lower frequency. The frequency converter 13 converts the the signal into a frequency band which can easily be processed by the frequency analyzer 16. The converted frequency can be varied as desired in the frequency converter 13. When the local frequency is shifted due to a temperature variation or the like, the output from the frequency converter 13 has a spectrum which is shifted in parallel from the spectrum of FIG. 2(a) on a frequency basis, with no variation in freuqency differences between the spectra. The output signal from the freuqency converter 13 is converted by an A/D converter 15 into a digital signal, which is then processed by the microcomputer 22.

Figure 4:
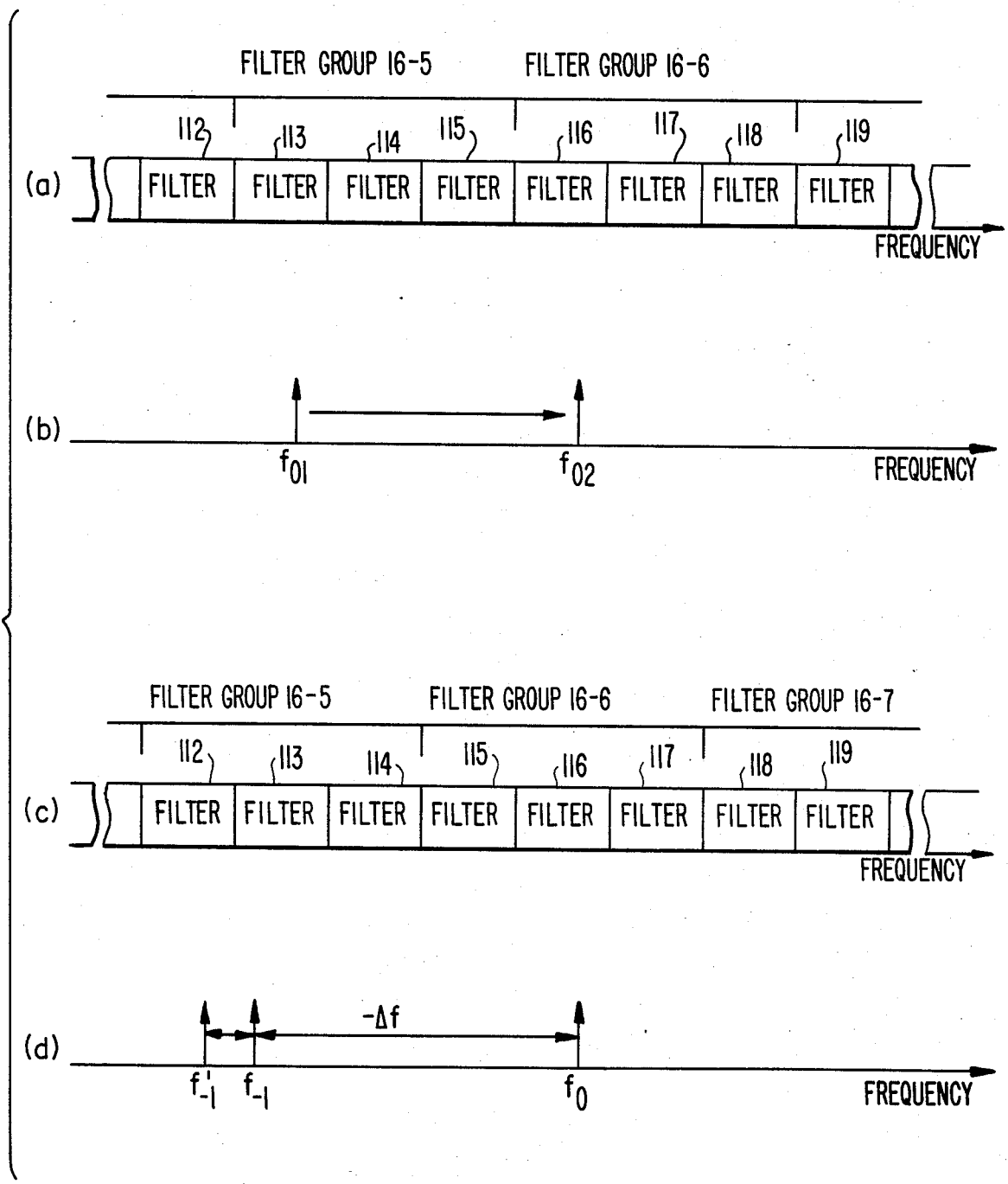
FIG. 4 is a diagram illustrative of the functions of a frequency anaylyzer circuit and an information decoder circuit in the transmitter/receiver system.

FIG. 3 is a block diagram of the frequency analyzer 16. The frequency analyzer 16 is composed of eleven filter groups 16-1 through 16-11 for separting the signal from the frequency converter 13 into respective spectra, each filter group being composed of a plurality of filters. For example, the filter group 16-1 comprises filters 101, 102, 102, and the filter group 16-2 comprises filters 104, 105, 106. The frequency of FIG. 2(b) is applied, as frequency-shifted, to the frequency analyzer 16, in which a signal of a frequency corresponding to the reference-frequency signal $f_0$ is first issued from one of the filter groups and applied to the information decoder 17. The information decoder 17 recognizes the first signal as the reference-frequency signal $f_0$, and controls the local oscillator 11 so that the reference frequency $f_0$ will be positioned in the vicinity of the center of the intermediate-frequency amplifier 12. Then, the information decoder 17 determines a frequency difference with the reference frequency $f_0$ dependent on which filter a next signal comes from, and drives the output circuit 14. The above operation will be described in greater detail with reference to FIG. 4. The filter groups 16-5, 16-6 are arranged as shown in FIG. 4(a). The filter group 16-6 serves to detect a signal in the vicinity of the center of the intermediate-frequency amplifier 12. In case the transmitted frequency and the local oscillation frequency of the receiver are properly adjusted, the reference frequency $f_0$ is detected at the position of the central filter 117 of the filter group 16-6. Now, it is assumed that the reference freuency $f_0$ is detected at the position $f_{01}$ in FIG. 4(b) due to a variation in the local oscillation frequency. This means that the filter 113 in the filter group 16-5 issues an output signal. Since the reference frequency $f_0$ should be produced in the filter group 16-6 which is at the center of the transmission band, the local oscillator 11 is controlled to correct the local oscillation frequency so that the reference frequency $f_0$ will be shifted from the position $f_{01}$ to the position $f_{02}$ in FIG. 4(b). For controlling the local oscillator 11, a voltage-variable capacitance element, for example, is employed as a control element for controlling the local oscillation frequency, and the information decoder circuit 17 generates eleven control voltages. Normally, the central control voltage among the eleven control voltages is applied to the voltage-variable capacitance element. When the reference frequency $f_0$ is detected by the filter group 16-5 as shown in FIG. 4, the difference 1 with the filter group 16-6 is computed, and the control voltage for the voltage-variable capacitance element is varied one step to thereby shift the reference frequency $f_0$ from $f_{01}$ to $f_{02}$. Then, the filters constituting the filter groups 16-1 through 16-6 are divided into different groups as shown in FIG. 4(c) so that the position of $f_{02}$ of FIG. 4 (b) will be brought to the center of the filter group 16-6. Thus, the filter group 16-5 is composed of filters 112, 113, 114, and the filter group 16-6 is composed of filters 115, 116, 117. The filter grouping as shown in FIG. 4(c) is carried out by the analyzed frequency control circuit 18 which is responsive to the result of the arithmetic operation in the information decoder 17 for applying a control signal to the frequency analyzer 16.

After the local oscillation frequency of the local oscillator 11 and the frequency analyzer 16 have been controlled, the comparator 20 ascertains whether the signal of the reference frequency is actually issued from the central fitler of the filter group located in the vicinity of the center of the band of the intermediate-frequency amplifier 12. If the reference frequency $f_0$ is confirmed, then the subsequent signal is received. If not, then noise is regarded as being received, and the local oscillator 11 and the frequency analyzer 16 are restored to their original conditions, waiting for the reference frequency $f_0$. Since however the first control mode may not necessarily effect linear control on the local oscillator 11 and the frequency analyzer 16, the frequency analyzer 16 is recorrected by the recorrecting circuit 19 for correcting control linearity when a signal is obtained in the vicinity of the reference frequency $f_0$. Dependent on which filter produces a signal, the information decoder 17 derives information from the relationship with respect to the reference frequency $f_0$, or from the frequency difference determined by the above table, for example, and drives the output circuit 21.

Now, it is assumed that the frequency $f_{-1}$ indicative of the difference between the reference freuqency $f_0$ and $-\Delta f$ as shown in FIG. 4 (d) is applied to the frequency analyzer 16. The circuit is designed such that if the reference frequency $f_0$ is located at the lefthand end of the band of the central filter 116 of the filter group 16-6, then the frequency $f_{-1}$ applied next will be brought to the lefthand end of the band of the central filter 113 of the filter group 16-5. If the filter bandwidth and the central frequency of the filters are varied slightly due to temperature changes, then $f'_{-1}$ would be located at the righthand end of the band of the filter 112 of the filter group 16-5 as shown in FIG. 4(d). However, a plurality of filters are grouped and one frequency is assigned thereto, as shown in FIG. 4(c), the filter group 16-5 with the frequency difference $-\Delta f$ is selected and no error is caused in signal discrimination.

Although each filter group in FIG. 3 is composed of three filters, each filter may be of a narrower bandwidth and each filter group may comprise more filters, so that the S/N ratio will be more improved, information can be decoded at a lower level, and the distance for which signals can be transmitted can be increased.

With the above arrangement of the invention, as described above, the difference with the reference frequency $f_0$ is transmitted as information, and the local oscillator 11 and the frequency analyzer 16 are controlled so that the reference frequency $f_0$ will be positioned in the center of the band of the intermediate-freuqency amplifier 12. Therefore, there is no possibility for the failure of receiving information due to variations in the local frequency, and the reference frequency $f_0$ is prevented from being discriminated in error due to noise. It is not necessary to increase the signal receiving. bandwidth to provide against temperature changes. The receiver may be of a narrow bandwidth to improve the S/N ratio to a large extent and increase the distance for which signals can be transmitted. Since the comparator 20 supervises the reference frequency, the reference frequency is prevented from being discriminated in error due to noise. As the control linearity can be controlled by the recorrecting circuit 19, the control linearity of the local oscillator 11 and the frequency analyzer 16 may not be strictly ensured.

While the output signal from the multi-frequency signal 7 has been described in the form shown in FIG. 2(b), the singal may be of the forms shown in FIGS. 2(c) through 2(e). FIG. 2(c) is illustrative of a signal transmission form in which the reference frequency $f_0$ is inserted between information frequencies. FIG. 2(d) shows a signal transmission form in which after a frequency $f_{-n}$ shifted from the reference frequency $f_0$ by $-nf$ has been transmitted, a signal of $f_n$ of an inverted sign shifted the distance $n \Delta f$ is transmitted. In FIG. 2(e), two reference frequencies $f_1$, $f_{-1}$ are employed. The signal form subsequent to the reference frequencies $f_1$, $f_{-1}$ is the same as shown in FIG. 2(c). Furthermore, the signal form is not limited to those shown in FIGS. 2(b) through 2(e), but may be any form provided that the reference frequency is first transmitted, and thereafter a signal containing information is transmitted. For example, signals of several frequencies may be transmitted on a parallel basis, or the reference frequency may be transmitted again at a final end to indicate the ending of communication. The controll local oscillator may be either the circuit 11 or the circuit 14. The frequency analyzer 16 may comprise an analog filter or a circuit utizling a Fourier transform process.

The informatin decoder 17 also can supply the output circuit 21 with a signal indicative of the ratio of the greatest amount of energy of a frequency component to the amount of energy of other frequency components. The output circuit 21 energizes a level meter of an LED array dependent on the energy amount ratio. This arrangement can be used as an electric-field-strength discriminating device for indicating the level of the signal picked up by the reception antenna 8.

Figure 5:
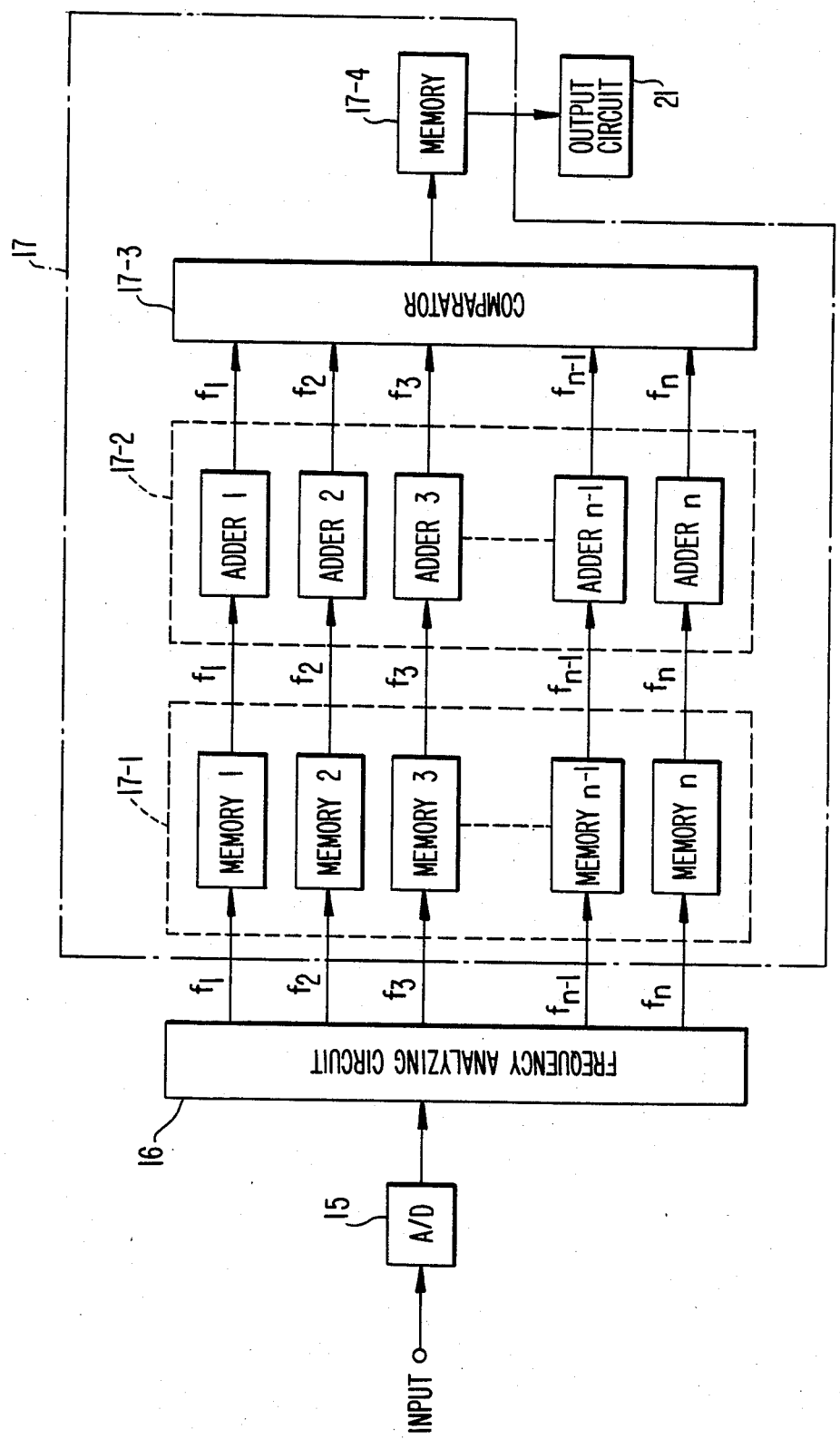
FIG. 5 is a block diagram of the information decoder circuit in the transmitter/receiver system.

The informaiton decoder 17 will be described in more detail with reference to FIG. 5. The information decoder 17 includes a memory group 17-1 composed of n memories 1 through n, an adder group 17-2 composed of n adders 1 through n, a comparator 17-3, and a memory 17-4. The information decoder 17 is connected to the output circuit 21. Functionally identical parts are denoted by identical reference characters in FIG. 1.

Figure 6:
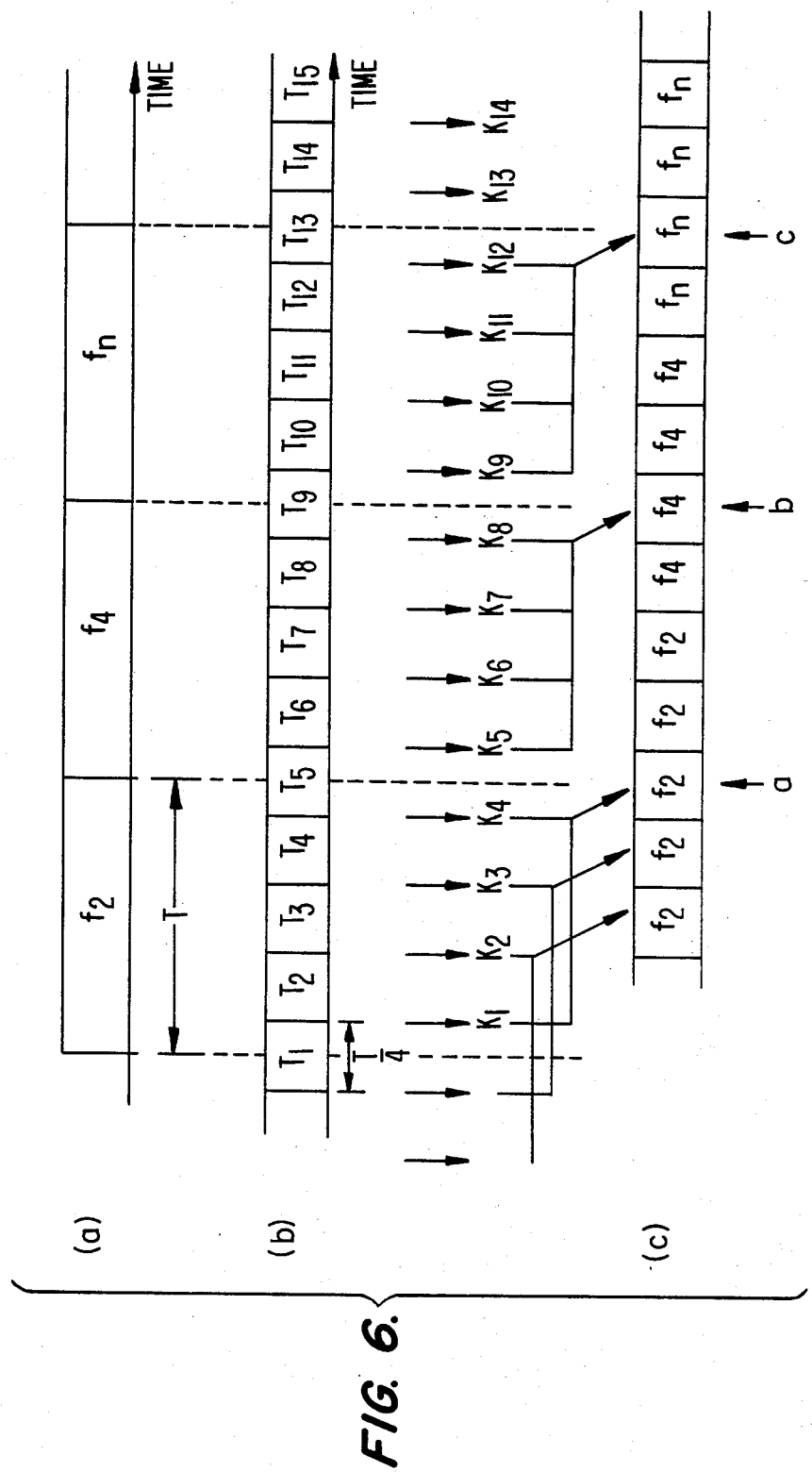
FIG. 6 is a diagram explanatory of the function of the information decoder circuit in the transmitter/receiver system.
Figure 7:
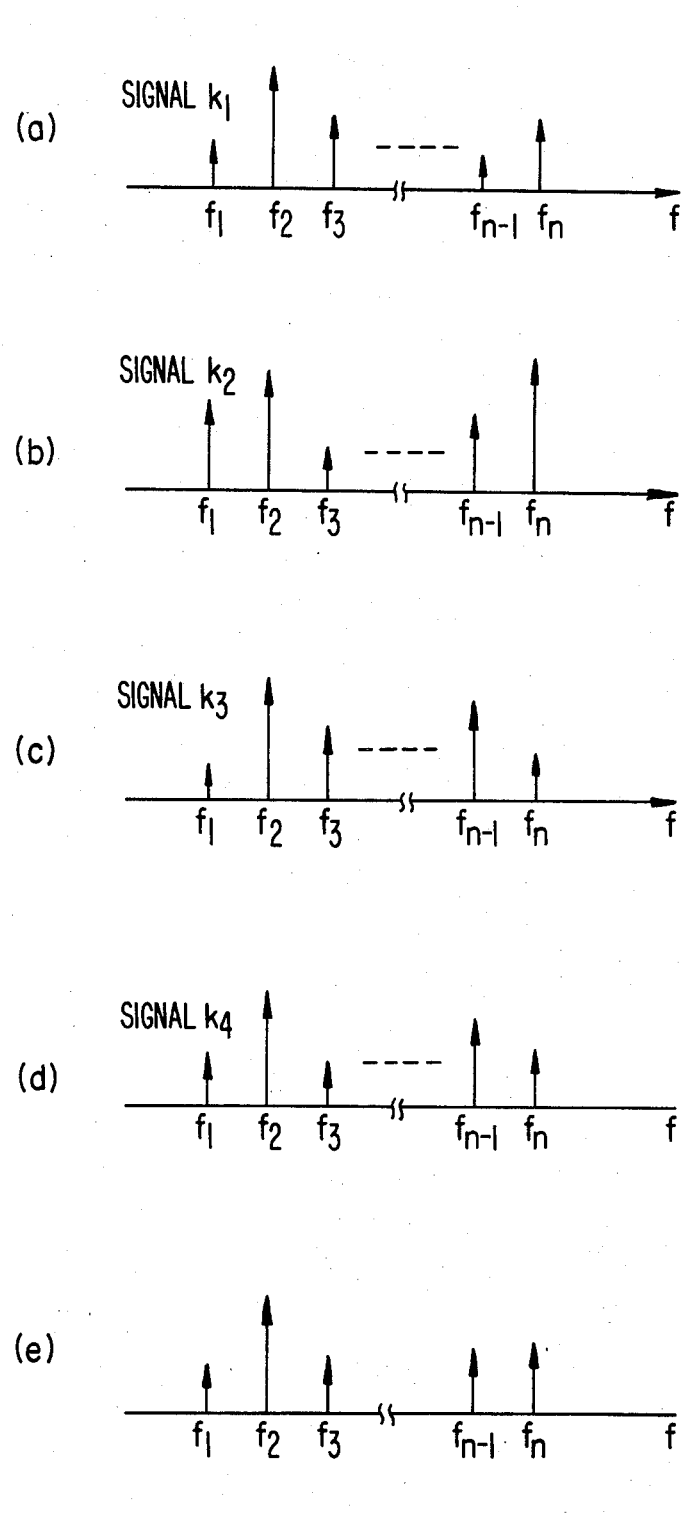
FIG. 7 is a diagram explanatory of the function of the information decoder circuit in the transmitter/receiver system.

Operation of the information decoder 17 of the above construction is as follows: A signal A applied to an input terminal is shown in FIG. 6(a). The signal A is converted by the A/D converter 15 into a digital signal which is analyzed as to frequency by the frequency analyzer 16. The frequency analyzer 16 introduces data for a T/4 second and effects a Fourier transform for frequency analysis. FIG. 6(b) shows the manner in which the frequency is analyzed by the frequency analyzer 16. Each of time intervals $T_1$ through $T_{15}$ is a T/4 second serving as a time period for introducing data for Fourier transform. The frequency analyzer 16 then issues analyzed outputs as indicated by $K_1$ through $K_{14}$. FIG. 7(a) shows the output $K_1$ in which the frequency component $f_2$ is greatest while the other frequency components are noise components of low level. Likewise, FIGS. 7(b) through (d) show analyzed outputs $K_2$ through $K_4$. In FIGS. 7(a) through 7(d), the S/N ratio of the signal A applied to the input terminal is poor, that is, noise is included in the signal A. Where the signal A contains noise, the analyzed outputs $K_1$ through $K_4$ include noise-dependent signal components other than the desired signal $f_2$. FIG. 7(b) shows an example in which a noise component fn is greater in level than the desired signal $f_2$. With respect to the signal $K_1$ which is issued as a result of analysis in $T_1$, the frequency analyzer 16 issues digital signals proportional to the magnitudes of frequency components as outputs $f_1$ through fn, and the data are stored in the memories 1 through n. Similarly, the signal $K_2$ indicative of the anaylized result in $T_2$ is stored in the memories 1 through n. Thus, four data up to $K_4$ are successively stored in the memories 1 through n. The adders 1 through n add the four data $K_1$, K₂, K₃, K₄ stored respectively in the memories 1 through n. More specifically, the adder 1 adds frequency components f₁ of the signals K₁, K₂, K₃, K₄, and the adder 2 adds frequency components f₂ of the signals K₁, K₂, K₃, K₄. Therefore, the adder group 17-2 issues signals indicative of the added four data K₁, K₂, K₃, K₄ as outputs f₁ through fn for the respective frequency components. By thus adding the four data for each of the frequency components, the frequency components generated due to noise are averaged in time and the signal component f₂ has its level much higher than the noise components. The output of FIG. 7(e) from the adder group is applied to the comparator 17-3 in which the frequency components are compared. As a result, the frequency component f₂ of the greatest energy is is issued from the comparator 17-3 to the memory 17-4. Then, a next freuqency analysis is effected by the frequency analyzer 16, which generates a signal K₅. The memory group 17-1 dischards the oldest data K₁ and newly stores the data K₅. Therefore, the memory group 17-1 stores the data K₂, K₃, K₄, K₅. The adder group 17-2 adds the above four data, and the sum is applied to the comparator 17-3 in which the levels of frequency components are compared, and then the frequency component of the greatest energy is stored in the memory 17-4. Subsequently, four data are added by the adder group 17-2 each time a frequency analysis is carried out by the frequency analyzer 16, frequency components of the greatest energy are detected by the comparator 17-3, and successively stored in the memory 17-4. FIG. 6(c) shows the manner in which the data are stored in the memory 17-4. Then, data of the greatest energy among the same frequency components (that is, added data in the time coinciding with the repetitive period of the signal), e.g., data a, b, c in FIG. 6(c), are picked up and applied to the output circuit 21 to drive the same.

While in the above embodiment the analysis time of the frequency analyzer has been described as T/4, it may be T/i (i is an integer). The memory 17-4 may be of any memory provided it can store a signal from the comparator 17-3, compare the stored signal with a next signal applied, and determine whether the signal is to be applied to the output circuit 21.

Figure 8:
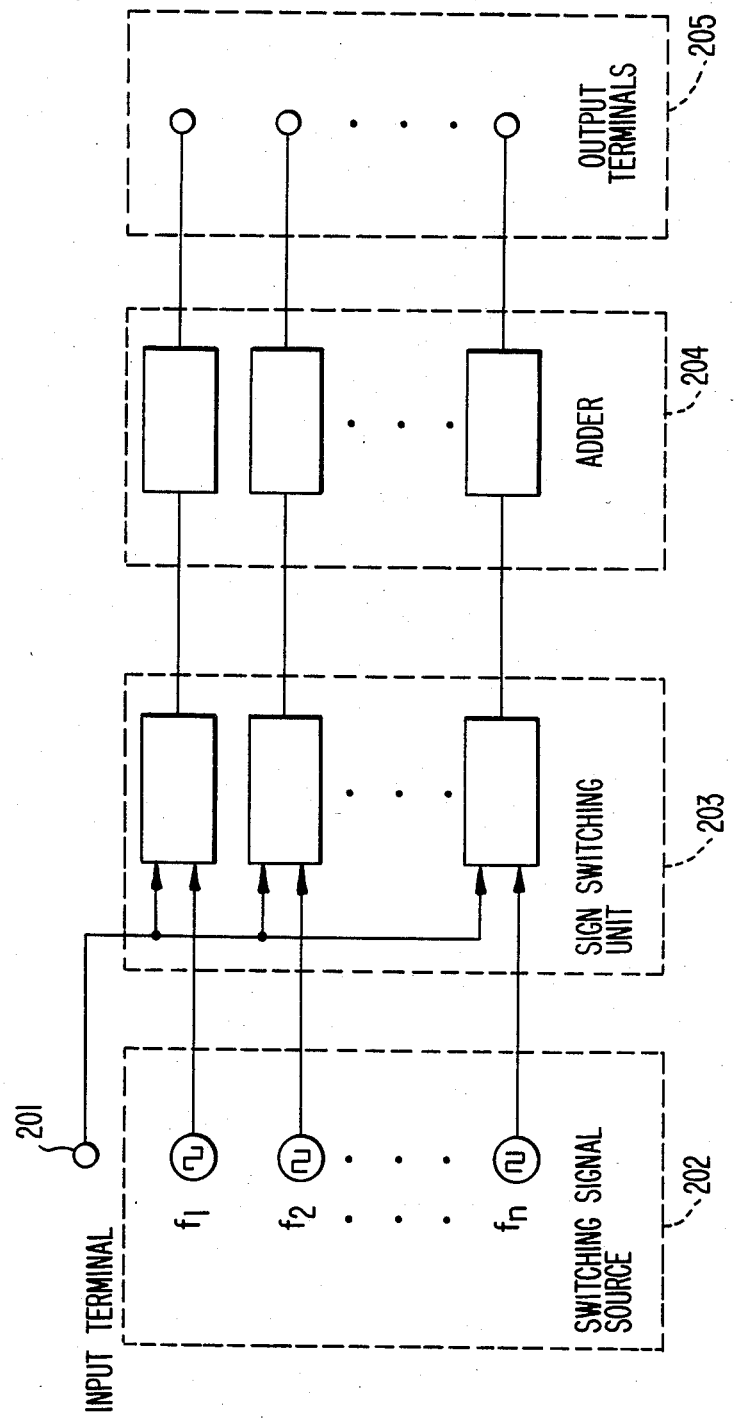
FIG. 8 is a block diagram of the frequency analyzer circuit in the transmitter/receiver system.
Figure 9:
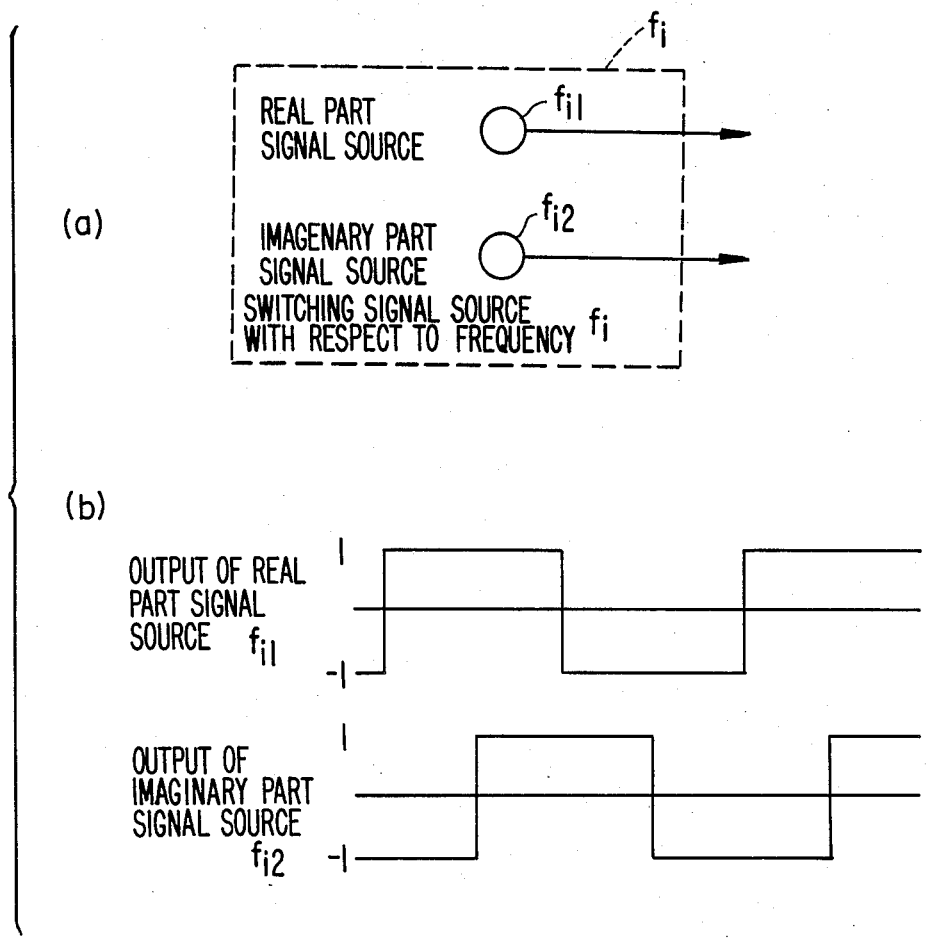
FIG. 9 is a diagram explanatory of the function of a switching signal source in the frequency analyzer circuit of FIG. 8.
Figure 10:
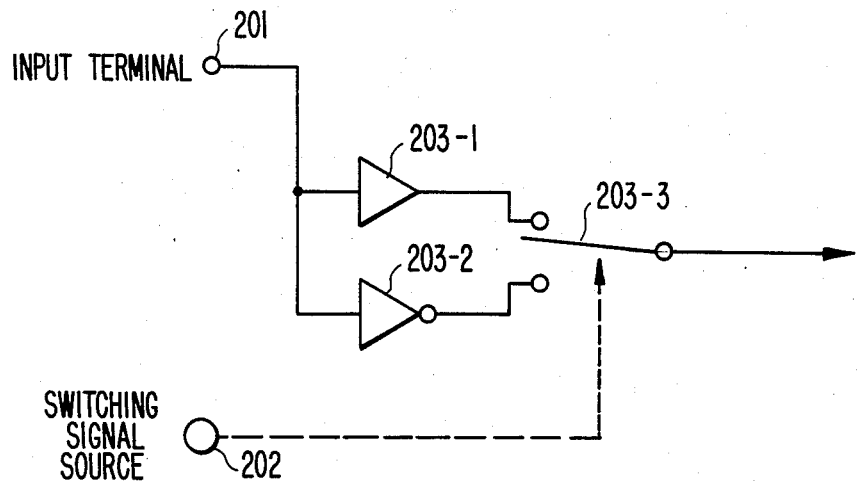
FIG. 10 is a diagram explanatory of the function of a code switching unit in the frequency analyzer circuit of FIG. 8.

A detailed circuit arrangement for the freuqency analyzer 16 shown in FIG. 1 will be described with reference to FIG. 8. The frequency analyzer has an input terminal 201, a switching signal source 202, a sign switching unit 203, an adder 204, and an output terminal 205. The frequency analyzer thus constructed will operate as follows:

A signal to be analyzed as to frequency is introduced through the input terminal 201. The switching signal source 202 for changing signs of the input signal with a frequency to be analyzed will be described with reference to FIG. 9. The switching signal source deals with complex numbers. As shown in FIG. 9(a), the switching signal source is composed of a real-number signal source $f_{i1}$ and and an imaginary-number signal source $f_{i2}$ for a certain frequency $f_i$. FIG. 9(b) illustrates output signals for switching which are issued from the switching signal source 202, the output signals being shifted 90° out of phase with each other. The sign swithcing unit 203 for changing the sign of the input signal with the switching signal does not invert the sign of the input signal at the level +1, but at the level −1 in FIG. 9(b). The sign switching unit 203 will be described with reference to FIG. 10, which shows only one sign switching circuit for the sake of brevity. The input signal is applied to a non-inverting amplifier 203-1 and an inverting amplifier 203-2, and one of outputs from these amplifiers is selected by a switch 203-3 controlled by the output signal from the switching signal source 202. Therefore, the sign of the input signal is controlled by the switching signal source 202. The input signals with changed signs are added in time by the adder 204 to produce an output signal for the frequency component f₁. With the above arrangement, therefore, the sign of the input signal is inverted at a frequency to be analyzed, and only an addition process is effected to produce the frequency component. No multiplier is required, and a general-purpose microcomputer can effect a frequency-analyzing process.

Figure 11:
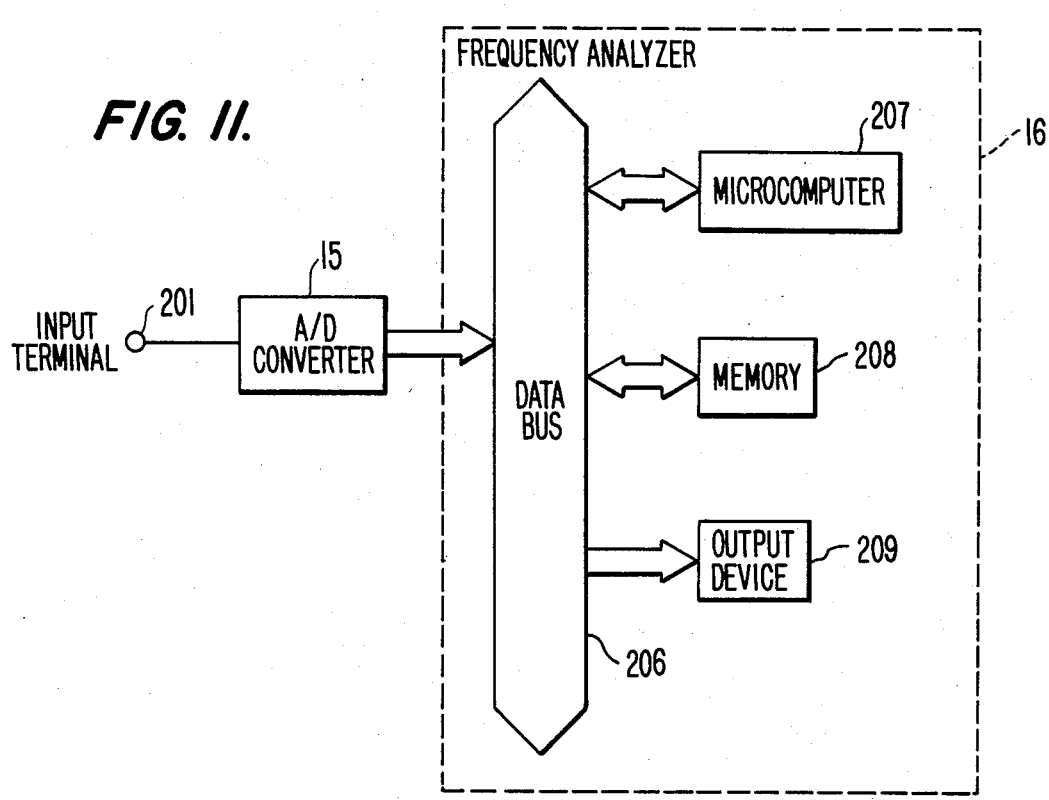
FIG. 11 is a block diagram of a frequency analyzer circuit according to another embodiment.

A frequency analyzer 16 according to another embodiment will be described with reference to FIG. 11. The frequency analyzer 16 of FIG. 11 employs a microcomputer operating on the basis of a high-speed Fourier transform algorithm. The frequency analyzer comprises an input terminal 201, an A/D converter 15, a data bus 206, a microcomputer 207, a memory 208, an output device 209. In operation, a signal to be analyzed as to frequency is supplied through the input terminal 201, and converted into a digital quantity by the A/D converter 15. The digital signal is then stored into the memory 208 through the data bus 206 under the control of the microcomputer 207. After a signal has been sampled by the A/D converter 15 for a certain period of time and the sampled signal has been stored in the memory 208, the microcomputer 207 effects a frequency analysis on the input signal. Assuming that an input signal sequence is expressed by x(n), an equation for transforming the input signal sequence into a frequency domain X(k) with a discrete Fourier transform is given by $$X(k) = \sum_{n=0}^{N-1} x(n)W_N^{nk},$$

k=0, 1, ..., N−1, where N is the number of samples in a certain period of time, and $W_N = exp(-j2\pi/N)$. The present invention is characterized in that $W_N$ is given as $U_N$ which is defined as follows:

$$U_N = \begin{bmatrix} 1 + j & Re(W_N) > 0, Im(W_N) > 0 \\ 1 - j & Re(W_N) > 0, Im(W_N) < 0 \\ -1 + j & Re(W_N) < 0, Im(W_N) > 0 \\ -1 - j & Re(W_N) < 0, Im(W_N) < 0 \end{bmatrix}$$

Therefore, an equation for transforming the input signal sequence x(n) into a sequence X(k) in the frequency domain according to the invention is given by:

$$X(k) = \sum_{n=0}^{N-1} x(n)U_N^{nk}$$

The value of $U_N^{nk}$ is selected dependent on whether the real and imaginary parts are positive or negative after $W_N^{nk}$ has been computed. Re($W_N$) and Im($W_N$) are indicative respectively of the real and imaginary parts of $W_N$. The decimation-in-time algorithm of a high-speed Fourier transform is based on breaking up the input signal sequence x(n) sequentially into smaller subsequences. The input signal sequence is divided into two even-numbered and odd-numbered sampled-value sequences expressed by x(2r) and x(2r+1), r=0, 1, ..., N-1. Therefore, $$X(k) = \sum_{n=0}^{N-1} x(n) U_N^{nk}$$

$$= \sum_{n \text{ even}} x(n) U_N^{nk} + \sum_{n \text{ odd}} x(n) U_N^{nk}$$

$$= \sum_{r=0}^{N/2-1} x(2r) \cdot U_N^{2rk} + \sum_{r=0}^{N/2-1} x(2r+1) \cdot U_N^{(2r+1)k}$$

$$= \sum_{r=0}^{N/2-1} x(2r) \cdot U_{N/2}^{rk} + U_N^k \sum_{r=0}^{N/2-1} x(2r+1) \cdot U_{N/2}^{rk}$$

$$= G(k) + U_N H(k)$$

Figure 13:
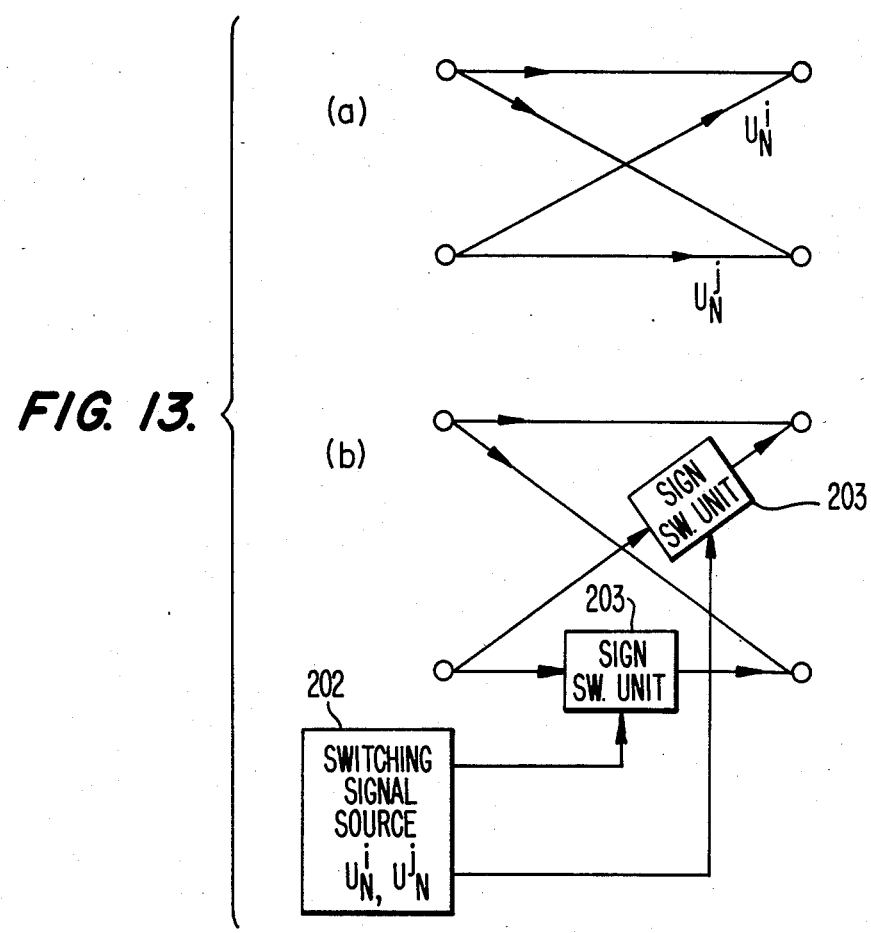
FIG. 13 is a diagram exaplantory of coefficients in the flow-graph of FIG. 12.
Figure 14:
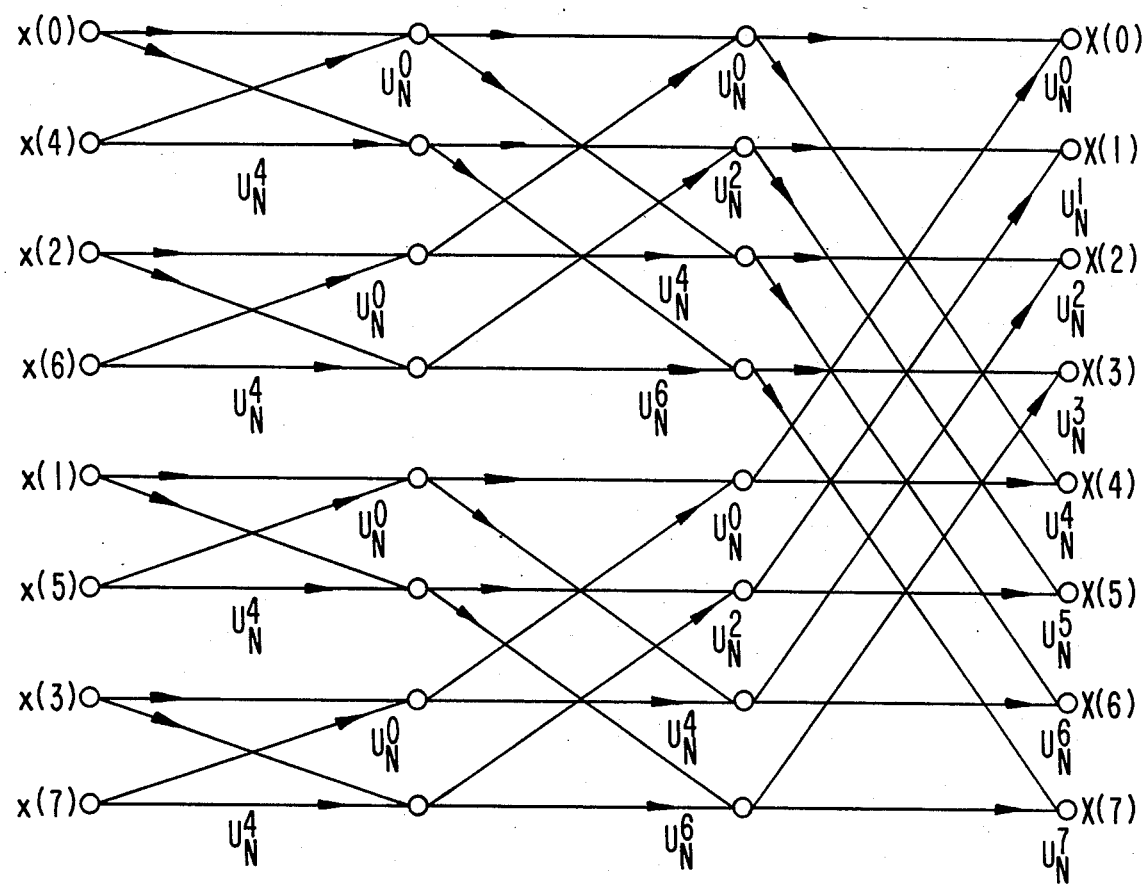
FIG. 14 is a flow-graph illustrative of another frequency analysis in the frequency analyzer circuit shown in FIG. 11.
Figure 15:
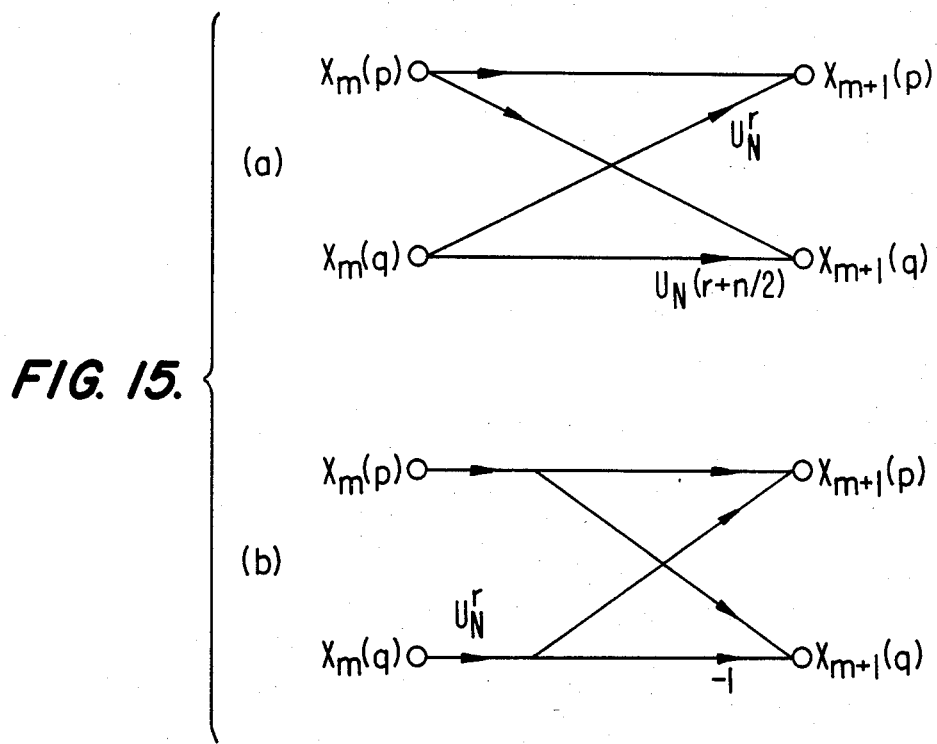
FIG. 15 is a flow-graph illustrative of still another frequency analysis in the frequency analyzer circuit shown in FIG. 11.

G(k), H(k) represent frequency analyses at N/2 points. FIG. 12(a) shows a flow-graph of frequency analyses at N/2 points (4 points) where N=8 (=$2^3$). Since input terminals 210 are supplied with even-numbered and odd-numbered signals sampled by the memory 208 (FIG. 11), they are different from conventional input terminals. The signal sequence x(n) is supplied through the input terminals 210 and subjected to frequency analyses at N/2 points in an N/2-point frequency analyzer 211 which issues G(k), H(k). By effecting the processing of $U_N^k$ on H(k), the second term {$U_N$H(k)} is found, and by adding G(k) to this, original 8-point frequency analyses can be achieved. FIG. 12(b) is illustrative of a flow-graph in which the N/2-point frequency analyzer 211 is further divided into 2-point frequency analyzers 212. In the flow-graphs of FIG. 12, branches joined at nodal points (indicated by small circles) represent addition. FIG. 13 is illustrative of branches having coefficients. FIG. 13(a) shows one matrix of the flow-graphs of FIG. 12. FIG. 13(b) shows the matrix which is accomplished by a switching signal source 202 and a sign switching unit 203. Since $U_N$ is ±1, the signs of signals on the branches are multiplied by the coefficients of the branches. Stated otherwise, the signal signs are changed by the sign signal source. Because the input signal sequence is divided into smaller subsequences by using the algorithm of a high-speed Fourier transform for frequency analysis, the number of additions after the signs of input signals have been changed is reduced for high-speed operation. FIG. 14 is a flow graph in which a decimation-in-time algorithm is completely divided at N=8. This computation is effected at $\log_2 N$ steps, and the computation at an mth step is followed by the computation at an (m+1)th step. The basic computation in this flow graph is represented by one X-shaped matrix from the mth step to the (m+1)th step, as shown in FIG. 15(a). The computation is given by:

$$Xm+1(p) = Xm(p) + U_N^r Xm(q)$$

$$Xm+1(q) = Xm(p) + U_N^{r+N/2} Xm(q)$$

Since $W_N^{N/2} = \exp-j(2\pi/N) \cdot N/2 = \exp(-j\pi) = -1$, $U_N$ is also $-1$, and the above equations become:

$$Xm-1(p) = Xm(p) + U_N^r Xm(q)$$

$$Xm-1(q) = Xm(p) - U_N^r Xm(q)$$

This is illustrated in FIG. 15(b). In this manner, the number of additions is reduced to $(N/2)\log_2 N$.

By controlling the signs of the input signals in the above manner, the frequency analysis can be performed without using multiplication. Although the above embodiment has been described with reference to the decimation-in-time algorithm, a decimation-in-frequency algorithm may also be used in which the input signal sequence first remains unchanged and is rearranged after a frequency analysis has been effected. The requirement is that the frequency analysis is effected without using multiplication by controlling the signs of the input signals.

Although certain preferred embodiments have been shown and described, it should be understood that many changes and modifications may be made therein without departing from the scope of the appended claims.

What is claimed is:

1. A transmitter/receiver system comprising:
   a transmitter which transmits a multi-frequency signal composed of a reference frequency signal having a reference frequency followed by at least an information signal having a frequency different from said reference frequency; and
   a receiver which receives said multi-frequency signal and produces an information corresponding to a frequency difference between said information signal and said reference signal,
   said receiver comprising:
   a frequency conversion means having a local oscillator for converting frequencies of said multi-frequency signal to lower frequencies;
   a frequency analyzing means for analyzing the lower-converted frequencies of said multi-frequency signal, which comprises a plurality of filters divided into groups each composed of at least three filters, each group being assigned to each of the lower-converted frequencies of said multi-frequency signal;
   a decoding means for decoding the analyzed frequencies to produce said information corresponding to said frequency difference, said decoding means controlling a local oscillation frequency of said local oscillator so that a lower-converted frequency signal corresponding to said reference frequency signal is outputted from a filter in a group assigned to said reference frequency signal in said frequency analyzing means; and
   a means for changing the grouping of said plurality of filters in said frequency analyzing means so that said lower-converted frequency signal corresponding to said reference frequency signal is outputted from a center filter among said at least three filters in said group assigned to said reference frequency signal.

* * * * *